United States Patent Office

2,794,764
Patented June 4, 1957

2,794,764

COMPOSITIONS CONTAINING CALCIUM QUINATE AND CALCIUM GLUCONATE AND/OR CALCIUM LEVULINATE

Lewis P. Albro, East Greenbush, and Johannes S. Buck, Glenmont, N. Y., assignors to Sterling Drug Inc., New York, N. Y., a corporation of Delaware No Drawing. Application April 29, 1953,
Serial No. 352,057

8 Claims. (Cl. 167—68)

This invention relates to complex salts of calcium gluconate or calcium levulinate with calcium quinate and to therapeutically useful aqueous solutions prepared therefrom which are particularly suitable for parenteral injections.

Our invention provides aqueous injectable preparations containing calcium in concentrations higher than obtainable with solutions of either calcium gluconate or calcium levulinate alone. For example, a concentrated solution prepared from a molar ratio of two parts of calcium quinate to one part of calcium gluconate was found to contain about 52 mg. of calcium per ml., as contrasted with 3.1 mg. of calcium per ml., the highest stable concentration of calcium obtainable in an aqueous solution containing calcium gluconate alone. As illustrative of the enhanced solubility of calcium levulinate effected by complex salt formation with calcium quinate, a concentrated solution prepared from a molar ratio of one part of calcium quinate to one part of calcium levulinate was found to contain about 72 mg. of calcium, as contrasted with about 47 mg. of calcium per ml., the highest stable concentration of calcium obtainable with a concentrated solution of calcium levulinate alone. In view of the enhanced solubility of calcium gluconate or calcium levulinate in the presence of calcium quinate, it is clearly indicated that calcium quinate enters into some kind of complex salt formation with each of these two salts, thereby providing valuable therapeutically useful solutions having high calcium content.

The aqueous solutions of our calcium quinate-calcium levulinate and calcium quinate-calcium gluconate preparations are substantially free from toxic and irritating properties.

The aqueous preparations of our invention were conveniently made by dissolving together the appropriate quantities of either calcium gluconate or calcium levulinate and calcium quinate in hot water or, alternatively, by treating an aqueous solution of quinic acid with the calculated quantity of calcium hydroxide and adding calcium gluconate or calcium levulinate thereto with heating. In addition, our aqueous preparations can be prepared by heating an aqueous mixture of quinic acid, gluconic acid (or levulinic acid) and the calculated quantity of calcium hydroxide. In the two latter procedures the resulting solution was then adjusted to the desired pH, about 6.0, diluted with water to yield the injectable preparation. In forming the calcium gluconate-calcium quinate aqueous preparations we found the preferred molar quantity of calcium quinate to be from about two-thirds to six times that of the calcium gluconate; and best results were obtained with calcium levulinate-calcium quinate preparations when the molar quantity of calcium quinate was from about one-third to two times that of calcium levulinate.

Our invention further comprehends dry compositions comprising either calcium gluconate or calcium levulinate and calcium quinate, the quinate salt being present in an amount sufficient to increase the solubility of calcium gluconate or calcium levulinate in water whereby the resulting aqueous solution has a concentration of calcium higher than that obtainable with concentrated solutions of either calcium gluconate or calcium levulinate alone. These solid compositions were prepared either by evaporating the aqueous solutions or by precipitation from the aqueous preparations with an organic solvent and drying the resulting product.

We do not know the exact chemical constitution of the complex salts of our invention. We found it extremely difficult to obtain analyses corresponding to stoichiometric proportions for these salts, probably because of incomplete removal of water of hydration on drying. However, we believe these complex salts are true double salts and not merely mixtures because of the enhanced solubility of the calcium gluconate or calcium levulinate in the presence of calcium quinate and because of the stability of the solutions obtained.

The invention is further illustrated by the following examples, but it is not limited thereto.

Example 1

A solution of calcium gluconate-calcium quinate containing 52.4 mg. of calcium per ml. was prepared as follows: 15.35 g. of quinic acid was dissolved in a minimum quantity of water at room temperature and then 2.96 g. of calcium hydroxide was added. The resulting mixture was stirred for about thirty minutes to effect solution. To this solution was added 8.97 g. of calcium gluconate monohydrate and the resulting slurry was heated to boiling and after a few minutes solution was complete. The resulting solution (40 ml.) was filtered through a filter-aid, allowed to stand in a glass-stoppered container for four days, filtered and the filtrate was found to contain 52.4 mg. of calcium per ml.

The above-described formulation was prepared using two moles of calcium quinate per mole of calcium gluconate. However, the molar quantity of calcium quinate can be varied from about two-thirds to six times that of the calcium gluconate and still result in satisfactory solutions.

Example 2

A highly soluble calcium gluconate-calcium quinate preparation was obtained as follows: A mixture of 16.9 g. of calcium quinate and 17.2 g. of calcium gluconate monohydrate was dissolved in 80 ml. of water by heating on a steam bath. The solution was then poured into about 1500 ml. of absolute ethanol, yielding a finely-divided, white crystalline material. The precipitate was first dried in vacuo at room temperature for eight hours (39.2 g.) and then in vacuo at 95° C. (36.5 g.). This solid material was found to contain 7.86% calcium and 0.39% water and was highly soluble in water.

Example 3

A solution of calcium levulinate-calcium quinate containing 72.8 mg. of calcium per ml. was prepared as follows: To a solution of 15.38 g. of quinic acid dissolved in a minimum quantity of water at room temperature was added 2.96 g. of calcium hydroxide and the resulting mixture was stirred for about thirty minutes to effect solution. To this solution was added 24.50 g. of calcium levulinate dihydrate and the resulting mixture was heated to boiling to effect solution. The resulting solution (59 ml.) was filtered through a filter-aid, allowed to stand in a glass-stoppered container for four days, filtered and the filtrate was found to contain 72.8 mg. of calcium per ml.

In the foregoing preparation a one-to-two molar ratio of calcium quinate to calcium levulinate was used. However, other molar ratios are operable; in fact, we found that the molar quantity of calcium quinate could be varied from about one-third to two times that of calcium levulinate.

Alternatively, calcium levulinate-calcium quinate solutions can be prepared as follows: A mixture containing 192 g. of quinic acid and 116 g. of levulinic acid, 74 g. of calcium hydroxide and 600 ml. of water is boiled until a clear solution resulted. The solution is then diluted with water to a volume of 800 ml. and filtered. One ml. of this solution contains 50 mg. of calcium.

*Example 4*

A highly soluble calcium levulinate-calcium quinate preparation was obtained as follows: A mixture of 16.9 g. of calcium quinate, 10.8 g. of calcium levulinate and 50 ml. of water was heated on a steam bath for about thirty minutes until the salts dissolved. The resulting solution was poured into 700 ml. of absolute ethanol to yield a finely-divided, white crystalline material. The precipitate was collected and dried in vacuo at room temperature for eight hours. A sample of this material when analyzed was found to contain 10.25% of calcium and 5.03% water; it was very soluble in water.

We claim:

1. A composition containing calcium salts and comprising calcium quinate and a member of the group consisting of calcium gluconate and calcium levulinate, said composition affording, in aqueous solution, a higher concentration of calcium than is afforded by a saturated solution of the most soluble of these calcium salt components alone.

2. An aqueous solution comprising calcium quinate and a member of the group consisting of calcium gluconate and calcium levulinate, containing a higher concentration of calcium than is afforded by a saturated solution of the most soluble of these calcium salt components alone.

3. An aqueous solution comprising calcium gluconate and calcium quinate containing a higher concentration of calcium than is afforded by a saturated solution of calcium quinate alone.

4. An aqueous solution comprising calcium levulinate and calcium quinate, containing a higher concentration of calcium than is afforded by a saturated solution of the most soluble of these calcium salt components alone.

5. An aqueous solution comprising calcium gluconate and calcium quinate, the molar quantity of calcium quinate being from about two-thirds to six times that of the calcium gluconate.

6. An aqueous solution comprising calcium levulinate and calcium quinate, containing a higher concentration of calcium than is afforded by a saturated solution of the most soluble of these calcium salt components alone, the molar quantity of calcium quinate being from about one-third to two times that of the calcium levulinate.

7. A dry composition comprising calcium gluconate and calcium quinate, each being present in amounts sufficient to afford an aqueous solution having a higher concentration of calcium than is afforded by a saturated solution of calcium quinate alone.

8. A dry composition comprising calcium levulinate and calcium quinate, each being present in amounts sufficient to yield an aqueous solution affording a higher concentration of calcium than is afforded by a saturated solution of the most soluble of these calcium salt components alone.

References Cited in the file of this patent

UNITED STATES PATENTS

| 2,117,777 | Warnat | May 17, 1938 |

FOREIGN PATENTS

| 359,862 | Great Britain | Oct. 29, 1931 |
| 647,080 | Great Britain | Dec. 6, 1950 |

OTHER REFERENCES

March et al.: "Solubilizing Effects of Calcium Salts Upon Calcium Gluconate," J. Am. Pharm. Assoc., July 1952, pp. 366 and 367.

Jenkins: "Stable Supersaturated Solutions of Calcium Gluconate," J. Am. Pharm. Assoc., June 1938, pp. 484–487.